US008213725B2

(12) United States Patent
Loui et al.

(10) Patent No.: US 8,213,725 B2
(45) Date of Patent: *Jul. 3, 2012

(54) SEMANTIC EVENT DETECTION USING CROSS-DOMAIN KNOWLEDGE

(75) Inventors: Alexander C. Loui, Penfield, NY (US); Wei Jiang, New York, NY (US)

(73) Assignee: Eastman Kodak Company, Rochester, NY (US)

( * ) Notice: Subject to any disclaimer, the term of this patent is extended or adjusted under 35 U.S.C. 154(b) by 657 days.

This patent is subject to a terminal disclaimer.

(21) Appl. No.: 12/408,140

(22) Filed: Mar. 20, 2009

(65) Prior Publication Data

US 2009/0299999 A1 Dec. 3, 2009

Related U.S. Application Data

(60) Provisional application No. 61/058,201, filed on Jun. 2, 2008.

(51) Int. Cl.
*G06K 9/62* (2006.01)

(52) U.S. Cl. ........ 382/224; 382/100; 382/155; 382/159; 382/181; 382/190; 382/195; 382/225; 382/226; 382/227

(58) Field of Classification Search .................. 382/100, 382/155–160, 181, 190, 191, 195, 224–227
See application file for complete search history.

(56) References Cited

U.S. PATENT DOCUMENTS

| 7,383,260 | B2 * | 6/2008 | Smith et al. ........................... 1/1 |
| 2008/0288523 | A1 | 11/2008 | Blose et al. |
| 2009/0154795 | A1 * | 6/2009 | Tan et al. ..................... 382/155 |

OTHER PUBLICATIONS

Lexing Xie, Dong Xu, Shahram Ebadollahi, Katya Scheinberg, Shih-Fu Chang and John R. Smith, "Detecting Generic Visual Events With Temporal Cues" Fortieth Asilomar Conference on Signals, Systems and Computers, Nov. 2006, pp. 54-58.*

Shahram Ebadollahi, Lexing Xie, Shih-Fu Chang and John R. Smith, "Visual Event Detection Using Multi-Dimensional Concept Dynamics" IEEE International Conference on Multimedia Expo, Jul. 2006, pp. 881-884.*

Jun Yang, Rong Yan and Alexander G. Hauptmann "Cross-Domain Video Concept Detection Using Adaptive SVMs", ACM, Proceedings of the 15th International Conference on Multimedia, Sep. 2007, pp. 188-197.*

(Continued)

*Primary Examiner* — Matthew Bella
*Assistant Examiner* — Eric Rush
(74) *Attorney, Agent, or Firm* — Raymond L. Owens

(57) ABSTRACT

A method for facilitating semantic event classification of a group of image records related to an event. The method using an event detector system for providing: extracting a plurality of visual features from each of the image records; wherein the visual features include segmenting an image record into a number of regions, in which the visual features are extracted; generating a plurality of concept scores for each of the image records using the visual features, wherein each concept score corresponds to a visual concept and each concept score is indicative of a probability that the image record includes the visual concept; generating a feature vector corresponding to the event based on the concept scores of the image records; and supplying the feature vector to an event classifier that identifies at least one semantic event classifier that corresponds to the event.

9 Claims, 10 Drawing Sheets

OTHER PUBLICATIONS

Belle L. Tseng, Ching-Yung Lin, Milind Naphade, Apostol Natsev and John R. Smith, "Normalized Classifier Fusion for Semantic Visual Concept Detection", IEEE, International Conference on Image Processing, Sep. 2003, pp. II-535-II-538.*

Li Fei-Fei and Pietro Perona, "A Bayesian Hierarchical Model for Learning Natural Scene Categories", IEEE, Computer Society Conference on Computer Vision and Pattern Recognition, Jun. 2005, pp. 524-531.*

Svetlana Lazebnik, Cordelia Schmid and Jean Ponce, "Beyond Bags of Features: Spatial Pyramid Matching for Recognizing Natural Scene Categories" IEEE, Computer Society Conference on Computer Vision and Pattern Recognition, 2006, pp. 2169-2178.*

Introduction to a Large-scale General Purpose Ground Truth Database: Methodology Annotation Tool and Benchmarks, Benjamin Yao, et al, 2007.

Visual Event Detection Using Multi-Dimensional concept Dynamics, S. Ebadollahi, et al, 2006.

Kodak's Consumer Video Benchmark Data Set: Concept Definition and Annotation, Alexander Loui, et al, 2007.

Large-Scale Multimodal Semantic Concept Detection for Consumer video, S. Chang, et al, 2007.

The Earth Mover's Distance as a Metric for Image Retrieval, Y. Rubner, et al, 2000.

Automated Event Clustering and Quality Screening of Consumer Pictures for Digital Albuming, A. Loui and A. Savakis, 2003.

Video Google: A Test Retrieval Apporach to Object Matching in Videos, J. Sivic and A. Zisserman, 2003.

On Spectral Clustering: Analysis and an Algorith A. Ng, et al., 2001.

Frustratingly Easy Domain Adaptation, Hal Daume III, 2007.

LSSCOM Lexicon Definitions and Annotations, DTO Challenge Workshop on Large Scale Concept Ontology for Multimedia, 2006.

Wei Jiang et al.: "Semantic Event Detection for Consumer Photo and Video Collections", Multimedia and Expo., 2008 IEEE International Conference on, IEEE, Piscataway, NJ, USA, Jun. 23, 2008, pp. 313-316, XP031312721, ISBN: 978-1-4244-2570-9, the whole document.

Wei Jiang et al.: "Cross-Domain Learning Methods for High-Level Visual Concept Classification", Image Processing, 2008, ICIP 2008, 15$^{th}$ IEEE International Conference, IEEE, Piscataway, NJ, USA, Oct. 12, 2008, pp. 161-164, XP031373963, ISBN: 978-1-4244-1765-0, the whole document.

Ando S et al.: "Unsupervised Cross-Domain Learning by Interaction Information Co-clustering", Data Mining, 2008, ICDM 08, Eighth IEEE International Conference On, IEEE, Piscataway, NJ, USA, Dec. 15, 2008, pp. 13-22, XP031423680, ISBN: 978-0-7695-3502-9, the whole document.

* cited by examiner

| SEMANTIC EVENTS | DEFINITION |
|---|---|
| WEDDING | BRIDE AND GROOM, CAKE, DECORATED CARS, RECEPTION, BRIDAL PARTY, OR ANYTHING RELATING TO THE DAY OF THE WEDDING |
| BIRTHDAY | BIRTHDAY CAKE, BALLOONS, WRAPPED PRESENTS, AND BIRTHDAY CAPS, USUALLY WITH THE FAMOUS BIRTHDAY SONG |
| CHRISTMAS | CHRISTMAS TREE AND THE USUAL CHRISTMAS DECORATIONS, NOT NECESSARILY TAKEN ON CHRISTMAS DAY |
| PARADE | PROCESSING OF PEOPLE OR VEHICLES MOVING THROUGH A PUBLIC PLACE |
| PICNIC | OUTDOOR, WITH OR WITHOUT A PICNIC TABLE, WITH OR WITHOUT A SHELTER, PEOPLE AND FOOD IN VIEW |
| TEAM SPORTS | BASKETBALL, BASEBALL, FOOTBALL, HOCKEY AND OTHER TEAM SPORTS |
| INDIVIDUAL SPORTS | TENNIS, SWIMMING, BOWLING AND OTHER INDIVIDUAL SPORTS |
| ANIMAL | PETS (E.G., DOGS, CATS, HORSES, FISH, BIRDS, HAMSTERS), WILD ANIMALS, ZOOS, AND ANIMAL SHOWS |
| SCHOOL ACTIVITY | SCHOOL GRADUATION, SCHOOL DAYS (FIRST OR LAST DAY OF SCHOOL) AND OTHER EVENTS RELATED TO SCHOOL |
| SHOW | SHOW AND CONCERTS, RECITALS, PLAYS AND OTHER EVENTS |

*FIG. 5*

SEMANTIC EVENT DETECTION USING CROSS-DOMAIN KNOWLEDGE

CROSS-REFERENCE TO RELATED APPLICATION

Reference is made to commonly assigned U.S. Patent Application Ser. No. 61/058,201 filed Jun. 2, 2008, and U.S. patent application Ser. No. 12/331,927, filed Dec. 20, 2008, both entitled "Semantic Event Detection for Digital Content Records" by Alexander Loui et al., the disclosures of which are incorporated herein by reference.

FIELD OF THE INVENTION

The invention relates to categorizing digital content records, such as digital still images or video. In particular, the invention relates to categorizing digital content records based on the detection of semantic events.

BACKGROUND

The advent of low cost electronic consumer imaging technology has resulted in a significant increase in the number of digital images captured by the average consumer. Indeed, as various forms of electronic memory have become increasingly less expensive over time, consumers have had a tendency to take even more digital still images and videos, as well as retain digital still images and videos they would have previously discarded. As a result, the average consumer is faced with an increasingly difficult problem in properly identifying and cataloging digital images for storage and later retrieval. In general, such identification and cataloging is usually performed manually, which can be an extremely time consuming process for the consumer.

As just one illustration, a consumer may travel to a number of different locations during the course of a vacation. The consumer may take images at each of the specific locations, as well as images at each of the locations that are related to other subject categories or events. For example, the consumer may take images of family members at each of the locations, images of specific events at each of the locations, and images of historical buildings at each of the locations. Upon return from travel, the consumer may desire to sort the digital images based on various groupings such as persons, birthdays, museums, etc., and to store the digital images based on the groupings in an electronic album. The consumer is currently faced with manually sorting through hundreds of digital still images and video segments in order to identify them with specific events.

In view of the above, automatic albuming of consumer photos and videos has gained a great deal of interest in recent years. One popular approach to automatic albuming is to organize digital images and videos according to events by chronological order and by visual similarities in image content. For example, A. C. Loui and A. Savakis, "Automated event clustering and quality screening of consumer pictures for digital albuming," IEEE Trans. on Multimedia, 5(3):390-402, 2003, the content of which is incorporated herein by reference, discusses how a group of digital images can be automatically clustered into events.

While basic clustering of images can group images that appear to be related to a single event, it would be desirable to be able to tag semantic meanings to the clustered events in order to improve the automatic albuming process. Semantic event detection, however, presents basic problems: first, a practical system needs to be able to process digital still images and videos simultaneously, as both often exist in real consumer image collections; second, a practical system needs to accommodate the diverse semantic content in real consumer collections, thereby making it desirable to provide a system that incorporates generic methods for detecting different semantic events instead of specific individual methods for detecting each specific semantic event; finally, a practical system needs to be robust to prevent errors in identification and classification.

SUMMARY

In accordance with the present invention there is provided a method for facilitating semantic event classification of a group of image records related to an event, the method using an event detector system for providing:

extracting a plurality of visual features from each of the image records;

wherein the visual features include segmenting an image record into a number of regions, in which the visual features are extracted;

generating a plurality of concept scores for each of the image records using the visual features, wherein each concept score corresponds to a visual concept and each concept score is indicative of a probability that the image record includes the visual concept;

generating a feature vector corresponding to the event based on the concept scores of the image records and;

supplying the feature vector to an event classifier that identifies at least one semantic event classifier that corresponds to the event.

The invention provides a system and method for semantic event detection in digital image content records. Specifically, an event-level "Bag-of-Features" (BOF) representation is used to model events, and generic semantic events are detected in a concept space instead of an original low-level visual feature space based on the BOF representation.

A feature of the present invention is that visual features include segmenting an image record into a number of regions, in which the visual features are extracted. This provides more information describing the content and improves the semantic understanding.

Another feature of the present invention is the cross-domain learning used to generate the feature vector. The cross-domain learning is based on image-level or region-level features. This provides a richer set of concept detecting which improves the semantic understanding.

In a preferred embodiment, an event-level representation is developed where each event is modeled by a BOF feature vector based on which semantic event detectors are directly built. Compared with a simplistic approach where image-level feature vectors are used for training classifiers, the present invention is more robust to the difficult images or mistakenly organized images within events. For example, in any given event, some images may be difficult to classify. These difficult images usually make the decision boundary complex and hard to model. By adopting the event-level feature representation, one is able to avoid the sensitivity problem by decreasing the influence of difficult or erroneous digital still images and videos segments in measuring event-level similarities. As will be shown, good detection performance is achieved with a small number of support vectors for Support Vector Machine (SVM) classifiers, i.e., the classification problem can be significantly simplified by the event-level representation.

BRIEF DESCRIPTION OF THE DRAWINGS

The invention will be described with reference to certain preferred embodiments thereof and the accompanying drawings, wherein:

FIG. 5 is a table illustrating different semantic events used in a test process and including their detailed definitions;

DETAILED DESCRIPTION OF THE PREFERRED EMBODIMENTS

Figure 1:
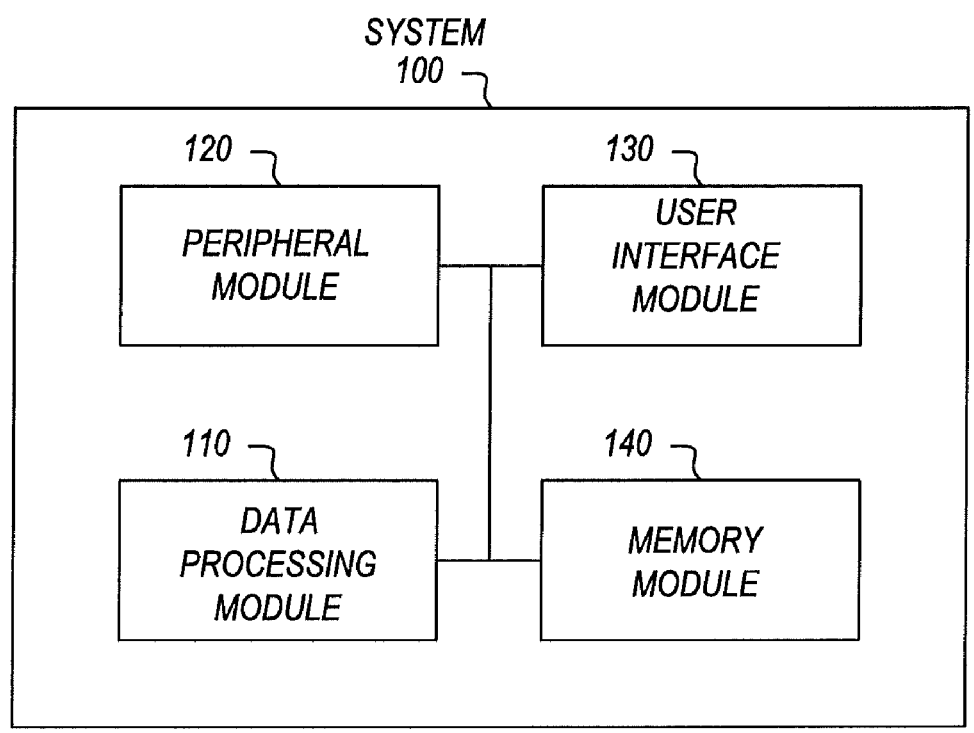
FIG. 1 is a schematic block diagram of a semantic event detection system in accordance with the invention.

Complex semantic events are usually generated by the concurrences of elementary visual concepts. For example, "wedding" is a semantic event associated with visual concepts such as "people", "flowers", "park", etc., evolving with a certain pattern. In general, a visual concept is defined as an image-content characteristic of an image, and is usually semantically represented by words that are broader than the words used to identify a specific event. Accordingly, the visual concepts form a subset of image-content characteristics that can be contributed to a specific event.

In the present invention, elementary visual concepts are first detected from images, and semantic event detectors are built in the concept space instead of in the original low-level feature space. Benefits from such an approach include at least two aspects. First, visual concepts are higher-level and more intuitive descriptors than original low-level features. As described in S. Ebadollahi et al., "Visual event detection using multi-dimensional concept dynamics," *IEEE ICME*, 2006, the content of which is incorporated herein by reference, concept scores are powerful to model semantic events. Second, the concept space in the present invention is preferably formed by semantic concept detectors, as described for example in S. F. Chang et al., "Multimodal semantic concept detection for consumer video benchmark," *ACM MIR*, 2007, the content of which is incorporated herein by reference, trained over a known consumer electronic image dataset of the type described, for example, A. C. Loui et al, "Kodak consumer video benchmark data set: concept definition and annotation," *ACM MIR*, 2007, the content of which is incorporated herein by reference. These semantic concept detectors play the important role of incorporating additional information from a previous image dataset to help detect semantic events in a current image dataset.

Assuming, for example, that the above-described dataset includes digital still images and video segments from real consumers, it is desirable that the entire dataset first be partitioned into a set of macro-events, and each macro-event be further partitioned into a set of events. The partition is preferably based on the capture time of each digital still image of video segment and the color similarity between them, by using the previously developed event clustering algorithm described above. For example, letting $E_t$ denote the t-th event which contains $m_p^t$ photos and $m_v^t$ videos. $I_i^t$ and $V_j^t$ denote the i-th photo and j-th video in $E_t$. Although images are grouped or clustered into events utilizing this algorithm, the events themselves are not identified or associated with semantic meanings. Accordingly, the goal of the present invention is to tag a specific semantic meaning, i.e., a semantic event $S_E$ such as "wedding" and "birthday", to a specific event $E_t$ and to the image records corresponding to the event.

It will be assumed that semantic events are generated by concurrent visual concepts like "people", "park" and "flowers", wherein $C_1, \ldots, C_N$ denote N visual concepts. Using the above-described semantic concept detectors, twenty-one (N=21) SVM based concept detectors are preferably developed using low-level color, texture, and edge visual features over the applied dataset. These semantic concept detectors are applied to generate twenty-one individual concept scores $p(C_1, I_i^t), \ldots, p(C_N, I_i^t)$ for each image $I_i^t$. These concept scores are then utilized to form a feature vector to represent image $I_i^t$ in the concept space as: $f(I_i^t) = [p(C_1, I_i^t), \ldots, p(C_N, I_i^t)]^T$ as will be described in greater detail.

Since a video segment from real consumers usually has diverse visual content from one long shot, each video $V_j^t$ is preferably partitioned into a set of segments $V_{j,1}^t, \ldots, V_{j,mj}^t$ with each segment having a given length (for example five seconds). The keyframes are then uniformly periodically sampled from the video segments (for example every half second). For example, let $I_{j,k,l}^t$ be the l-th keyframe in the k-th segment $V_{j,k}^t$, then $I_{j,k,l}^t$ can also be represented by a feature vector $f(I_{j,k,l}^t)$ in the concept space in the same manner as a digital still image. It will be understood that different sampling rates may be readily employed than those illustrated above.

Both digital still images and video segments are defined as data points represented by x. For example, event $E_t$ contains $m^t = m_p^t + \tilde{m}_v^t$ data points in total, where $\tilde{m}_v^t$ is the entire number of video segments from the $m_v^t$ video clips in $E_t$. Semantic event detection is then performed based on these data points and the corresponding feature vectors developed from the concept scores.

The BOF representation has been proven effective for detecting generic concepts for images. See, for example, J. Sivic and A. Zisserman, "Video google: a text retrieval approach to object matching in videos", ICCV, pp 1470-1477, 2003, the content of which is incorporated herein by reference. In BOF, images are represented by a set of orderless local descriptors. Through clustering techniques, a middle-level visual vocabulary is constructed where each visual word is formed by a group of local descriptors. Each visual word is considered as a robust and denoised visual term for describing images.

For example, let $S_E$ denote a semantic event, e.g. "wedding", and let $E_1, \ldots, E_M$ denote M events containing this semantic event. Each $E_t$ is formed by $m_p^t$ photos and $\tilde{m}_v^t$ video segments. Similar to the visual vocabulary, a concept vocabulary is constructed by clustering these $$\sum_{t=1}^{M} m^t$$

(where $m^t = m_p^t + \tilde{m}_v^t$) data points into n concept words. Each concept word is treated as a pattern of concept concurrences that is a common character for describing all the events containing $S_E$. Specifically, to accommodate both still video images and video data points, a spectral clustering algorithm (See, for example, A. Y. Ng, M. Jordan, and Y. Weiss, "On spectral clustering: analysis and an algorithm," *Advances in NIPS*, 2001, the contents of which are incorporated herein by reference.) is adopted to construct the concept vocabulary based on pairwise similarities measured by the Earth Mover's Distance (EMD), which is described in Y. Rubner, C. Tomasi, and L. Guibas, "The earth mover's distance as a metric for image retrieval," *IJCV*, 2000, the content of which is incorporated herein by reference.

Each data point is treated as a set of images, i.e., one image for a still video image and multiple images for a video segment. Then EMD is used to measure the similarity between two data points (image sets). There are many ways to compute the distance between two image sets, e.g. the maximum/minimum/mean distance between images in these two sets. These methods are easily influenced by noisy outlier images, while EMD provides a more robust distance metric. EMD finds a minimum weighted distance among all pairwise distances between two image sets subject to weight-normalization constraints, and allows partial match between data points and can alleviate the influence of outlier images.

The EMD between two data points is calculated as follows. Assume that there are $n_1$ and $n_2$ images in data points $x_1$ and $x_2$, respectively. The EMD between $x_1$ and $x_2$ is a linear combination of ground distance $d(I_p^1, I_q^2)$ weighted by flow $f(I_p^1, I_q^2)$ between any two images $I_p^1 \in x_1$, $I_q^2 \in x_2$.

$$D(x_1, x_2) = \frac{\sum_{p=1}^{n_1} \sum_{q=1}^{n_2} d(I_p^1, I_q^2) f(I_p^1, I_q^2)}{\sum_{p=1}^{n_1} \sum_{q=1}^{n_2} f(I_p^1, I_q^2)} \quad (1)$$

where an optimal flow matrix $f(I_p^1, I_q^2)$ is obtained from the following linear program:

$$\min \sum_{p=1}^{n_1} \sum_{q=1}^{n_2} d(I_p^1, I_q^2) f(I_p^1, I_q^2)$$

$$w.r.t \ f(I_p^1, I_q^2), 1 \le p \le n_1, 1 \le q \le n_2$$

$$s.t. \ f(I_p^1, I_p^2) \ge 0, \sum_{q=1}^{n_2} f(I_p^1, I_q^2) \le w_p^1, \sum_{p=1}^{n_1} f(I_p^1, I_q^2) \le$$

$$w_q^2 \sum_{p=1}^{n_1} \sum_{q=1}^{n_2} f(I_p^1, I_q^2) = \min\left\{\sum_{p=1}^{n_1} w_p^1, \sum_{q=1}^{n_2} w_q^2\right\}$$

where $w_p^1$ and $w_q^2$ are weights of image $I_p^1$ and $I_q^2$ in data points $x_1$ and $x_2$, respectively. Here equal weights are used: $w_p^1 = 1/n_1$, $w_q^2 = 1/n_2$. The Euclidean distance over concept score features is used as the distance $d(I_p^1, I_q^2)$. From Eq(1), EMD finds the best matching image pairs in two data points.

The weight normalization constraints ensure that each image has enough matches in the other set. When both $x_1$ and $x_2$ are photos, the EMD is just the Euclidean distance. The pairwise EMD is then converted to the pairwise similarity by a Gaussian function: $S(x_1, x_2) = \exp(-D(x_1, x_2)/r)$, where r is the mean of all pairwise distances between all training data points.

Spectral clustering as mentioned above is a technique for finding groups in data sets consisting of similarities between pairs of data points. Here the algorithm developed in Ng et al. is adopted and is described as follows. Given the similarity matrix $S(x_i, x_j)$:

Get affine matrix $A_{ij} = S(x_i, x_j)$, if $i \ne j$, and $A_{ii} = 0$.
Define diagonal matrix $D_{ii} = \Sigma_j A_{ij}$. Get $L = D^{-1/2} A D^{-1/2}$.
Find eigenvectors $u_1, \ldots, u_n$ of L corresponding to the n largest eigenvalues, and get $U = [u_1, \ldots, u_n]$, where n is determined by the energy ratio of eigenvalues to keep.
Get matrix V from U by re-normalizing U's rows to have unit length.
Treat each row in V as a point in $R^n$ (the i-th row corresponding to the original i-th data point), and cluster all the points into n clusters via the K-means algorithm.

Each data cluster obtained by the spectral clustering algorithm is called a concept word, and all the clusters form a concept vocabulary to represent and detect semantic events. Let $W_j^i$ denote the j-th word learned for semantic event $S_{Ei}$, $S(x, W_j^i)$ denote the similarity of data x to word $W_j^i$ calculated as the maximum similarity between x and the member data points in $W_j^i$: $S(x, W_j^i) = \max_{x_k \in W_j^i} S(x_k, x)$, where $S(x_k, x)$ is defined in the same way as described above. For each data x, vector $[S(x, W_1^i), \ldots, S(x, W_n^i)]^T$ is treated as a BOF feature vector for x. Assume that event $E_t$ contains $m^t$ data points, and based on above BOF feature vectors, event $E_t$ can also be represented by a BOF feature vector $f_{bof}(E_t)$ as: $f_{bof}(E_t) = [\max_{x \in E} S(x, W_1^i), \ldots, \max_{x \in E} S(x, W_n^i)]^T$. Finally, using the BOF feature $f_{bof}$ a binary one-vs.-all SVM classifier is learned to detect semantic event $S_{Et}$.

Referring now to FIG. 1, a system 100 for semantic event detection for digital content records according to an embodiment of the present invention is illustrated. The system 100 includes a data processing unit 110, a peripheral unit 120, a user interface unit 130, and a memory unit 140. The memory unit 140, the peripheral unit 120, and the user interface unit 130 are communicatively connected to the data processing system 110.

Figure 2:
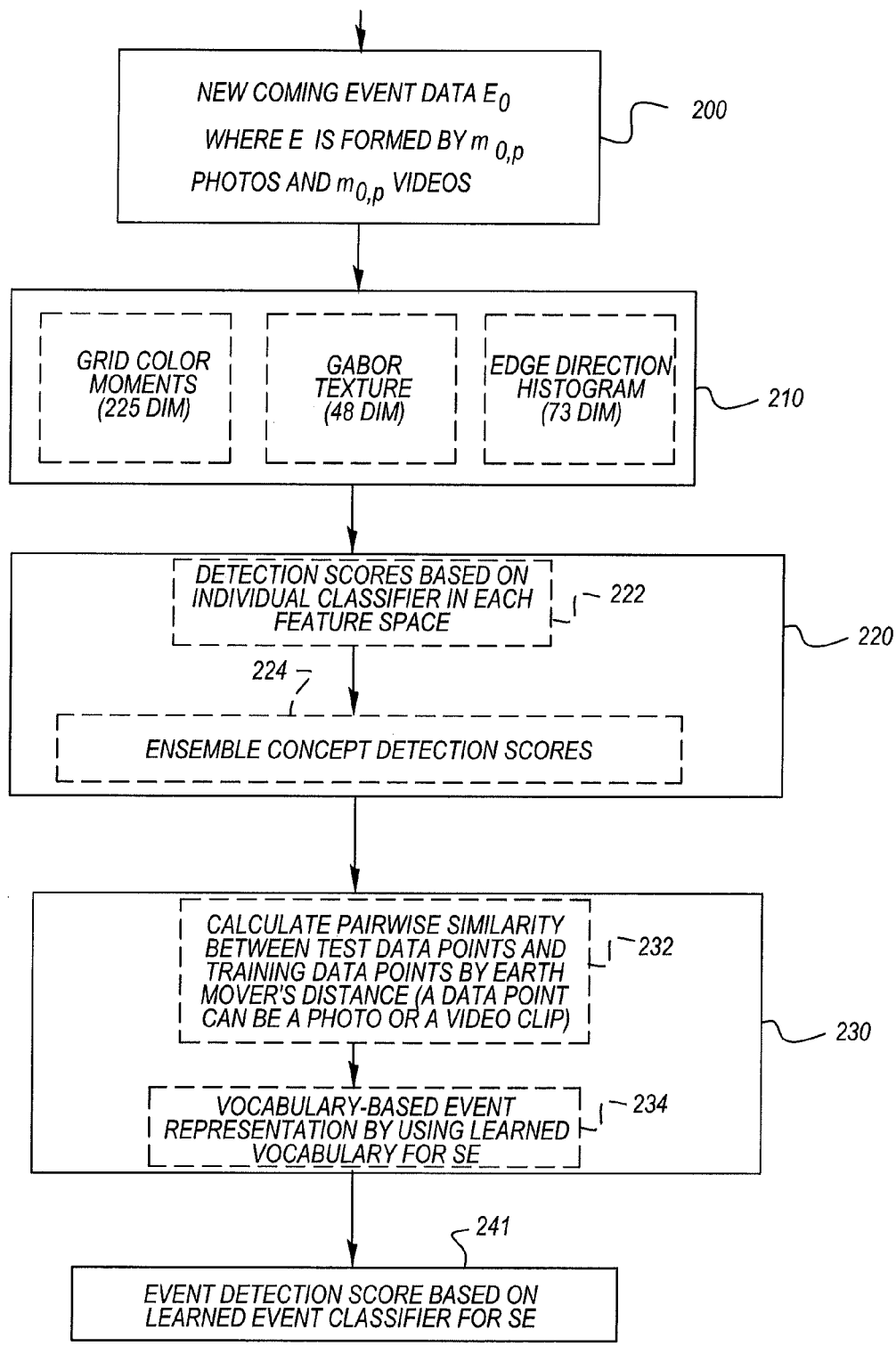
FIG. 2 is a flow diagram illustrating processing modules to generate the vocabulary-based event representation utilized by the semantic event detection system illustrated in FIG. 1.
Figure 3:
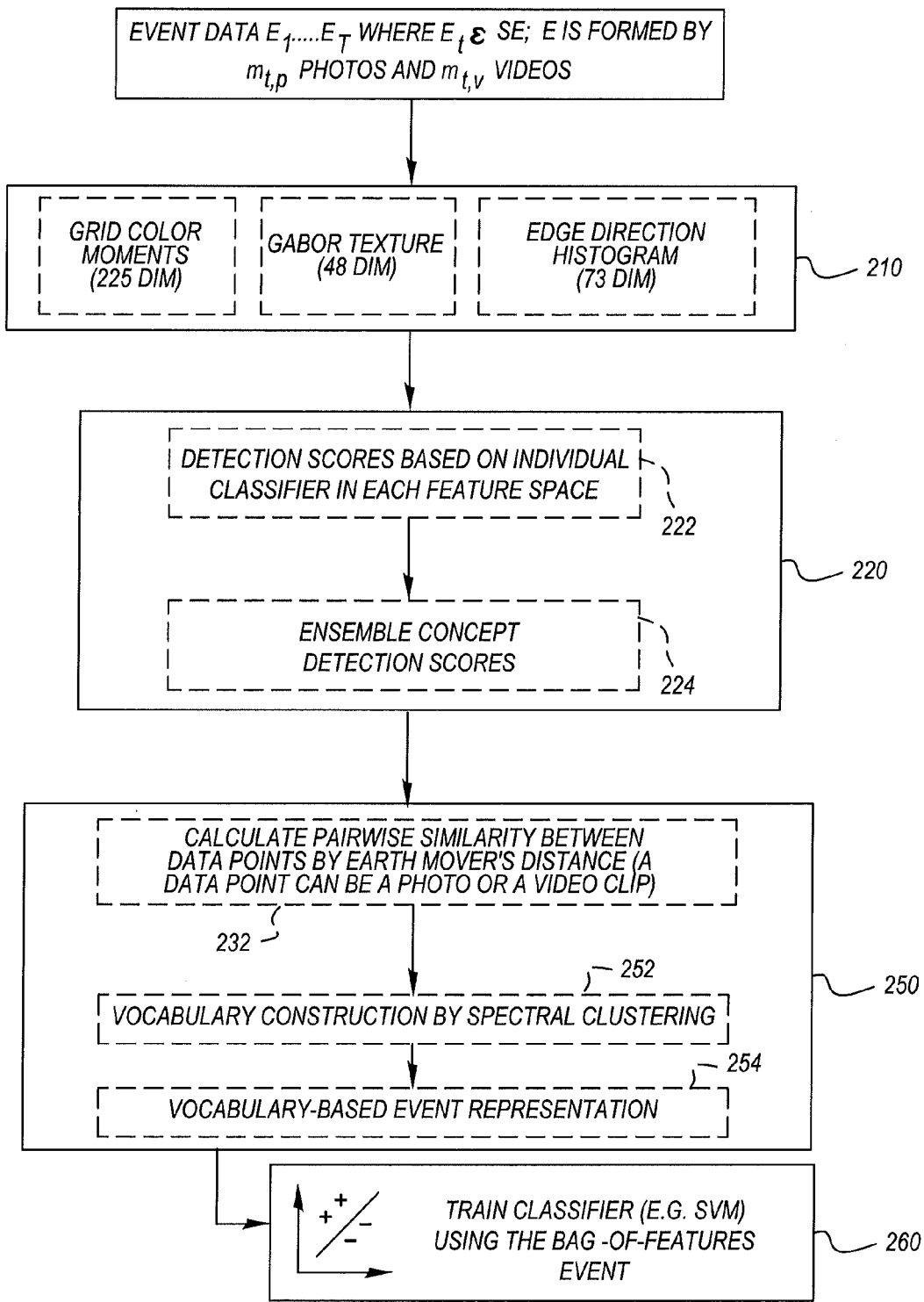
FIG. 3 is a flow diagram illustrating processing modules to generate the BOF event vocabulary utilized to train the system illustrated in FIG. 1 for semantic event detection.
Figure 4:
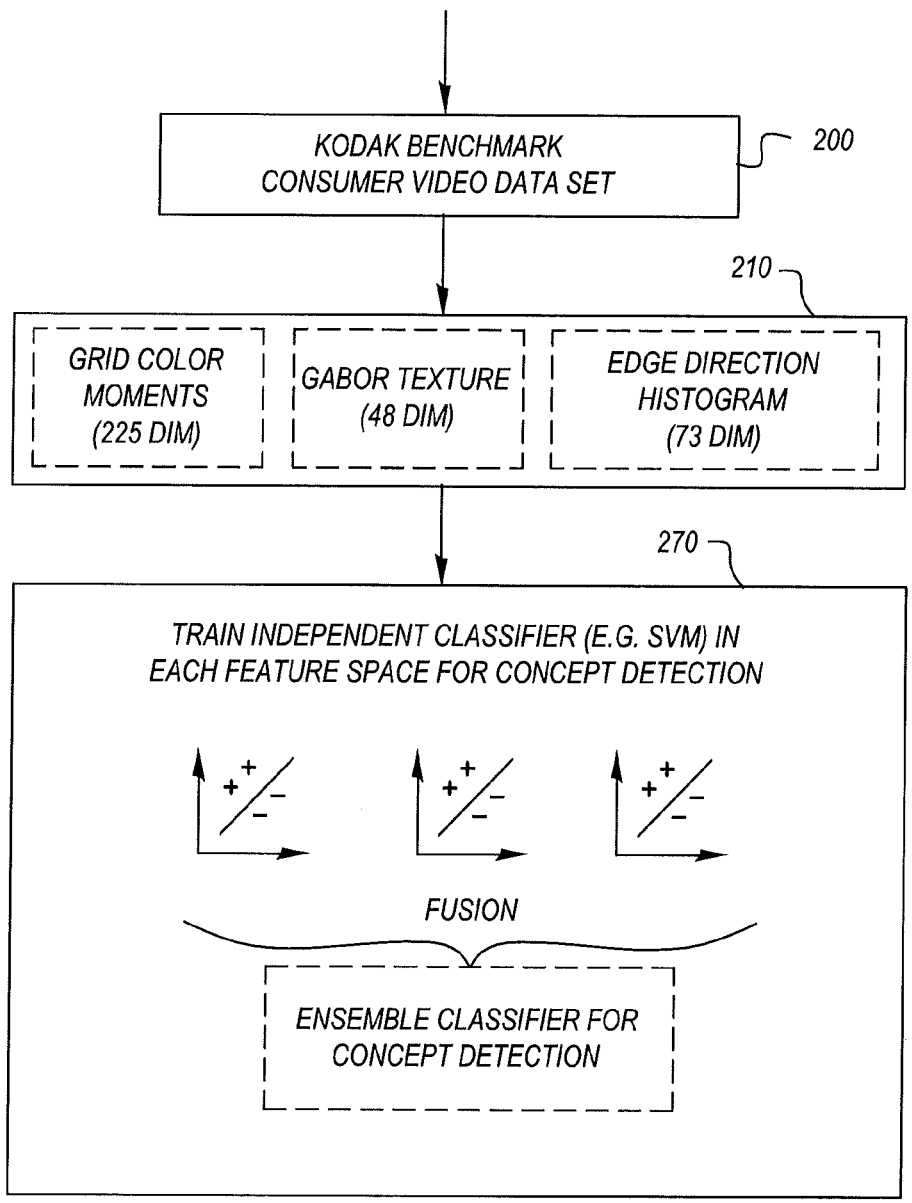
FIG. 4 is a flow diagram illustrating processing modules utilized to train concept detectors employed in the system illustrated in FIG. 1.

The data processing system 110 includes one or more data processing devices that implement the processes of the various embodiments of the present invention, including the example processes of FIGS. 2-4 described herein. The phrases "data processing device" or "data processor" are intended to include any type of data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The memory unit 140 includes one or more memory devices configured to store information, including the information needed to execute the processes of the various embodiments of the present invention, including the example processes of FIGS. 2-4 described herein. The memory unit 140 may be a distributed processor-accessible memory system including multiple processor-accessible memories communicatively connected to the data processing system 110 via a plurality of computers and/or devices. On the other hand, the memory unit 140 need not be a distributed processor-accessible memory system and, consequently, may include one or more processor-accessible memories located within a single data processor or device. Further, the phrase "memory unit" is intended to include any processor-accessible data storage device, whether volatile or nonvolatile, electronic, magnetic, optical, or otherwise, including but not limited to, floppy disks, hard disks, Compact Discs, DVDs, flash memories, ROMs, and RAMs or any other digital storage medium.

The phrase "communicatively connected" is intended to include any type of connection, whether wired or wireless, between devices, data processors, or programs in which data may be communicated. Further, the phrase "communicatively connected" is intended to include a connection between devices or programs within a single data processor, a connection between devices or programs located in different data processors, and a connection between devices not located in data processors at all. In this regard, although the memory unit 140 is shown separately from the data processing system 110, one skilled in the art will appreciate that the memory unit 140 may be implemented completely or partially within the data processing system 110. Further in this regard, although the peripheral system 120 and the user interface system 130 are shown separately from the data processing system 110, one skilled in the art will appreciate that one or both of such systems may be implemented completely or partially within the data processing system 110.

The peripheral system 120 may include one or more devices configured to provide digital content records to the data processing system 110. For example, the peripheral system 120 may include digital video cameras, cellular phones, regular digital cameras, or other data processors. In addition, the peripheral system 120 may include the necessary equipment, devices, circuitry, etc. to connect the data processing system 110 to remote sources of data. For example, the system 100 may be linked via the Internet to servers upon which datasets are stored. The datasets may include datasets of digital content records used to train the system 100 or datasets including digital content records that are to be analyzed by the system 100. The data processing system 110, upon receipt of digital content records from a device in the peripheral system 120, may store such digital content records in the processor-accessible memory system 140 for future processing or, if sufficient processing power is available, analyze the digital content records in real time as a received data stream.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the memory unit 140 even though the user interface system 130 and the memory unit 140 are shown separately in FIG. 1.

The basic operation of the system will now be described with reference to FIG. 2, which is a flow diagram illustrating processing modules that are implemented by one or more of the units illustrated in FIG. 1. It will be understood that the processing modules contain instructions that are implemented by one or more of the units provided in system 100. In the illustrated example, a new event ($E_0$) is provided to the system 100 via a data entry module 200, where it is desired that the probability that $E_0$ belongs to a specific semantic event be determined. For example, based on operator instructions received via the user interface unit 130, the data processing unit 110 controls the operation of the peripheral unit 120 to download the data corresponding to $E_0$ into the memory unit 140. Each event contains a plurality of digital content records, in the illustrated example still digital images $m_{0,p}$ and video segments $m_{0,v}$, that are grouped together according to capture time and color similarity utilizing the previously described clustering method. The clustering method is applied to a dataset of still digital images and video segments prior to submission to the system 100. Alternatively, the dataset is provided to the system 100 and the data entry module 200 can perform the clustering operation as one operational element of the data processing unit 110 in order to generate $E_0$.

For example, a consumer may capture a dataset consisting of one hundred digital still images and videos of a plurality of different events using an electronic camera. A memory card from the electronic camera is provided to a card reader unit as part of the peripheral unit 120. In response to control instructions entered by a user via the user interface unit 130, the data processing unit 110 controls the operation of the peripheral unit 120 to download the dataset from the memory card to the memory unit 140. The data processing unit 110 then proceeds to perform the clustering algorithm on the dataset in order to group the digital still images and videos into a plurality of clusters that correspond to the plurality of events. Thus, the functions of the instructions provided within the data entry module 200 are completed and a number of digital still images and videos (for example 10 out of the original 100) are identified as being associated with $E_0$. At this point, although ten digital still images and videos have been associated with $E_0$, $E_0$ has yet to be associated with a particular semantic event such as "wedding".

A visual feature extraction module 210 is then utilized to obtain keyframes from the video segments in $E_0$ and to extract visual features from both the keyframes and the digital still images contained in $E_0$. In the illustrated example, the visual feature extraction module 210 determines grid-based color moments, Gabor texture and edge directional histogram for each of the digital still images and videos. It will be understood, however, that other visual features may be readily employed other than those utilized in the illustrated example.

The data processing unit 110 performs the necessary keyframe and visual feature extraction utilizing conventional techniques on each of the digital still images and videos contained with $E_0$ in accordance with the instructions provided within the visual feature extraction module 210. Accordingly, three visual feature representations of each of ten digital still images and videos corresponding to $E_0$ are now available for further analysis.

The three visual features extracted by the feature extraction module 210 are utilized by a concept detection module 220 to generate concept scores reflective of the probability that a particular keyframe or still digital image is related to a specific semantic event. The concept detection module 220 preferably determines the concept scores using a two step process. First, a concept score detection module 222 is provided that utilizes twenty-one of the above-described SVM semantic concept detectors (implemented by the data processing unit 110) to generate a concept score based on each individual classifier in each visual feature space for each digital still image and keyframe. Second, the individual concept scores are then fused by a fusion module 224 (implemented by the data processing unit 110) to generate an ensemble concept detection score for a particular digital still image or keyframe, thereby reducing the amount of data to be further processed.

In a preferred embodiment, the fusion module 224 first normalizes the different classification outputs from different features by a sigmoid function $1/(1+\exp(-D))$ where D is the output of the SVM classifier representing the distance to the decision boundary. Fusion is accomplished by taking the average of the classification outputs from the different visual features for each of the twenty-one concepts to generate the ensemble concept detection score.

In a simplified example, three concepts "people", "park" and "flowers" will be discussed. Concept scores for "people", "park" and "flowers" are generated for each of the three visual feature representations of each of the ten images of $E_0$. For example, the color feature representation of a first image in the group of ten images may have a 90% probability of containing people, a 5% probability of containing a park and a 5% probability of containing flowers, the texture feature representation of the first image has a 5% probability of containing people, an 80% probability of containing a park, and a 15% probability of containing flowers, and the edge detection feature of the first image has a 10% probability of containing people, a 50% probability of containing a park, and a 40% probability of containing flowers.

Given three visual feature representations of ten images, thirty sets of concept scores would be generated (one for each visual feature representation) with each set containing three individual concept scores (one for "people", one for "park" and one for "flowers"). In order to generate an ensemble concept score for the first image, the probabilities for each of the concepts for each of the visual representations is averaged, such that the ensemble concept score for the first image would be 35% probability of containing people (average of the people probabilities for color 90%, texture 5% and edge 5%), a 30% probability of containing a park (average of the park probabilities for color 5%, texture 80% and edge 5%), and a 20% probability of containing flowers (average of the flowers probabilities for color 5%, texture 15% and edge 40%).

The ensemble concept scores are subsequently provided to a BOF module 230 which determines a BOF vector for $E_0$. The BOF feature vector for $E_0$ is obtained by first determining individual feature vectors for each of the digital still images and video segments contained within $E_0$ using the ensemble concept score of each respective digital still image and video segment. In the preferred embodiment, each digital still image or video segment is treated as a data point, and a pairwise similarity between the ensemble concept score of each data point in $E_0$ and the ensemble concept score of each predetermined positive training data point for a given semantic event (SE), for example "wedding", is then calculated by a similarity detection module 232 using EMD. Effectively, an individual feature vector is obtained for each of the digital still images and video segments contained in $E_0$. A mapping module 234 is then used to map each of the individual feature vectors of $E_0$ to a codebook of semantic events (previously developed during a training process described in greater detail below), and an event feature vector for $E_0$ is generated based on the mapped similarities.

The event feature vector can now be supplied to a classifier module 241. In the illustrated example, the classifier module 241 is utilizes a SVM classifier to generate an event detection score for $E_0$. The event detection score represents a final probability that the new event $E_0$ corresponds to a given semantic event such as "wedding". The event detection score is then preferably compared with a predetermined threshold to determine if $E_0$ should be categorized as a wedding event. The predetermined threshold may be varied depending on the level of accuracy required by the system 100 in a given application.

Once $E_0$ has been proper categorized, the still digital images and video segments corresponding to $E_0$ are tagged with the appropriate semantic event classifier and sorted into appropriate album folders or files and stored in the memory unit 140 for later retrieval. Alternatively, the tagged still digital images and video segments are written to an image storage medium via the peripheral unit 120. The tagging of the still digital images and video segments with semantic event classifiers provides an additional advantage of enabling the images and video segments to be easily retrieved by search engines.

Training of the system 100 will now be described with reference to FIG. 3 First, T positive training events $E_1, \ldots, E_T$ are entered using the data entry module 200. Each event $E_t$ contains $m_{t,p}$ photos and $m_{t,v}$ videos grouped together according to capture time and color similarity by the previously described clustering method. The visual extraction module 210 is then used to extract keyframes from video segments, and visual features are extracted from both the keyframes and the digital still images. As in the case of the operation described above, the visual features include grid-based color moments, Gabor texture and edge directional histogram. The concept detection module 220 (comprised of a concept score detection module 222 and a fusion module 224 described above) is then used to generate the ensemble concept scores for the keyframes and the digital images as discussed above.

A BOF learning module 250 is then employed to train the system 100. First, each digital image or video segment is treated as a data point and a pairwise similarity between each pair of data points is calculated by EMD using the similarity detection module 232 previously described. Based on the pairwise similarity matrix, a spectral clustering module 252 is used to apply spectral clustering to group the data points into different clusters, with each clustering corresponding to one code word. To train a classifier for detecting semantic event SE, all training events $E_i$ ($E_i$ contains both positive training events and negative training events for SE) are mapped to the above codebook to generate a BOF feature vectors for each training event by a mapping module 254. Based on the BOF feature vectors, a classifier training module 260 is used to train a binary SVM classifier to detect a specific semantic event SE.

FIG. 4 depicts the details of the training process for the video concept detectors utilized in the concept score detection module 222 (shown in FIG. 3). For a concept C, N positive training videos from a benchmark consumer video data set are provided via the data entry module 200. Keyframes are obtained from videos and visual features are extracted from the keyframes as in the prior examples utilizing the visual feature extraction module 210. The visual features include grid-based color moments, Gabor texture and edge directional histogram. A concept training module 270 is then used to train the concept detectors. Namely, based on each type of visual feature, each keyframe is represented as a feature vector, and a binary SVM classifier is trained to detect concept C. The discriminant function of these classifiers over individual types of features are averaged together to generate the ensemble concept detector for concept C.

Figure 6:
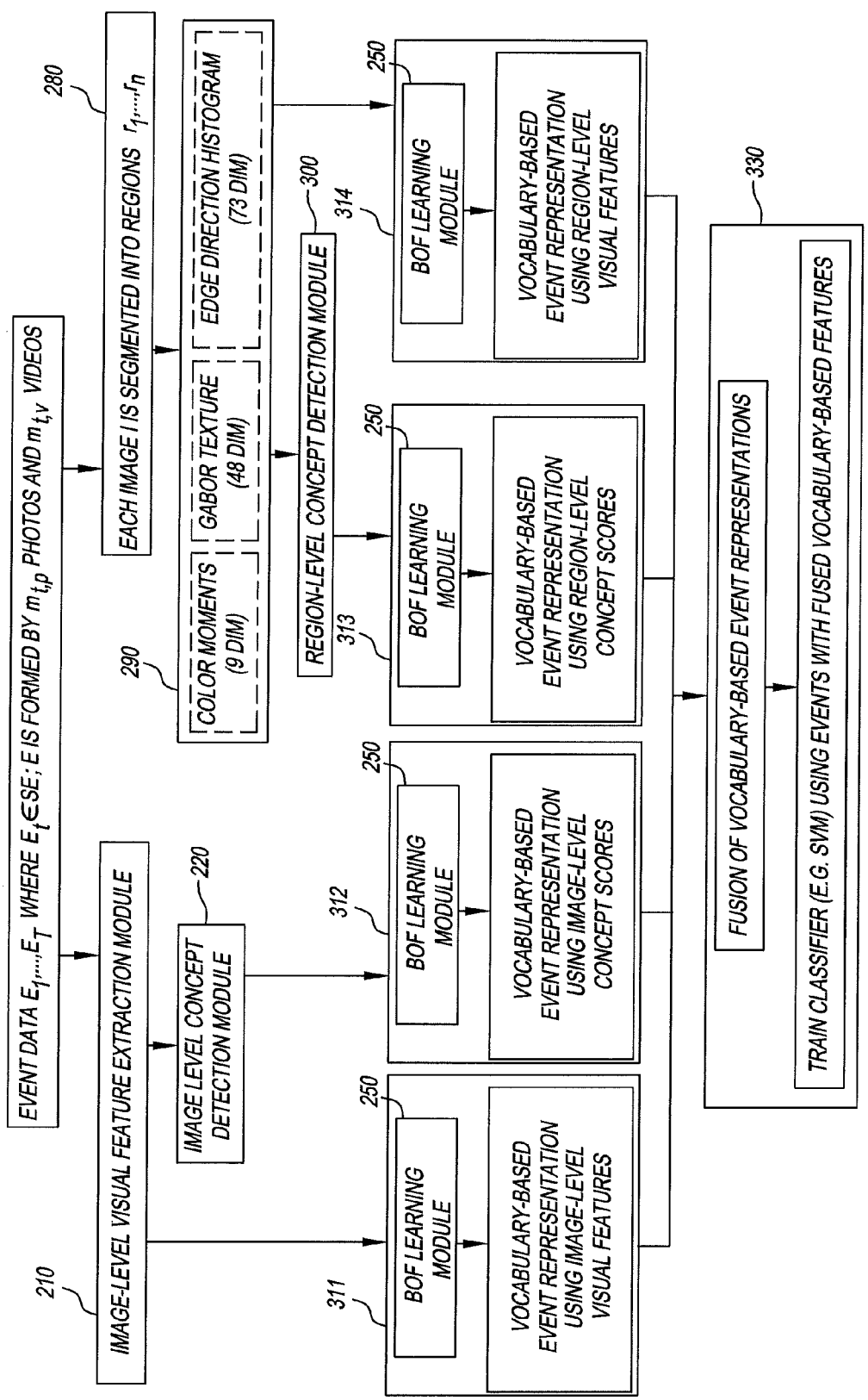
FIG. 6 is a flow diagram illustrating processing modules utilized to train the system illustrated in FIG. 1 for semantic event detection.

Region-level representation provides useful detailed information to describe the image content, which is complementary to global image level features. FIG. 6 describes the detailed training process utilized to learn the semantic event detection system illustrated in FIG. 2, which includes both image-level and region-level learning modules. In the regional approach, each image is segmented into a set of regions $r_1, \ldots, r_n$ as depicted in the image segmentation module 280. Each region is represented by a feature vector in either concept space (by using the region-level concept detection module 300) or low-level visual space (by using the region-level visual feature extraction module 290). By a straightforward generalization, our previous bag-of-features event-level representation learning framework described in the BOF learning module 250 in FIG. 3 uses region-level features to generate event-level BOF representation for helping semantic event detection.

As described above, each image (a still photo or a keyframe from video) is treated as a single-point feature set, where the feature vector in this single-point set is formed by the concept detection scores over the entire image. If a feature vector is extracted for each segmented region, each image is treated as a multiple-point set consisting of multiple regional feature vectors. The same bag-of-features event-level representation learning module 250 can still be applied to obtain the event-level BOF feature vector for semantic event detection, as depicted in the BOF learning using region-level concept score module 313 and the BOF learning using region-level visual feature module 314.

With the proliferation of digital photos and videos, the amount of unlabeled test data is large and growing while the size of available labeled training set is fixed and small. To enable the event detectors trained over relatively few training data generalize well over massive unlabeled data, the cross-domain learning (or domain adaptation) technique, as described for example in the paper by H. Daumé III, "Frustratingly easy domain adaptation", Annual Meeting of the Association of Computational Linguistics, 2007, is incorporated into our system.

Assuming an old domain $D^o$ (for example, a set of broadcast news videos) which has been well studied, and a current domain $D^c$ (for example, the consumer event collection) to be analyzed, cross-domain learning, in accordance with the invention ports information from $D^o$ to help analyze $D^c$, which has the effect of increasing the underlying training data for $D^c$ by borrowing information from old domain $D^o$. An example of domain adaptation is as follows: a set of models are built based on the old domain $D^o$ which generate predictions for data in the current domain $D^c$. Then the predictions are used as features for learning in $D^c$, where predictions from $D^o$ play the role of porting information to $D^c$.

Two outside data sources that are very different from consumer event collection are used to provide additional knowledge for helping semantic event detection task. The first one is the NIST TRECVID 2005 broadcast news video set. 449 detectors are trained over this data set to detect 449 concepts from the LSCOM ontology. The LSCOM ontology is described in "LSCOM lexicon definitions and annotations V1.0," DTO Challenge Workshop on Large Scale Concept Ontology for Multimedia, Columbia Univ. ADVENT Tech. Report, 2006. Out of these 449 detectors, 374 detectors corresponding to 374 most frequently occuring concepts are used as the models built in the old TRECVID 2005 domain, which are applied to consumer event data to generate prediction scores by using the image-level concept detection module 220 in FIG. 6. These cross-domain concept prediction scores are fed into the bag-of-features event-level representation learning framework to generate BOF event-level features as described in the BOF learning using image-level concept score module 312. These features are combined with the original BOF event-level features learned from the consumer video collection described by A. Loui, et al., "Kodak consumer video benchmark data set: Concept definition and annotation," ACMMIR, 2007, to help semantic event detection. The learning process for obtaining BOF event-level features generated from these consumer videos is described in FIG. 3 where the concept detection module 220 uses concept detectors trained with the consumer videos by using the training framework in FIG. 4.

Figure 8:
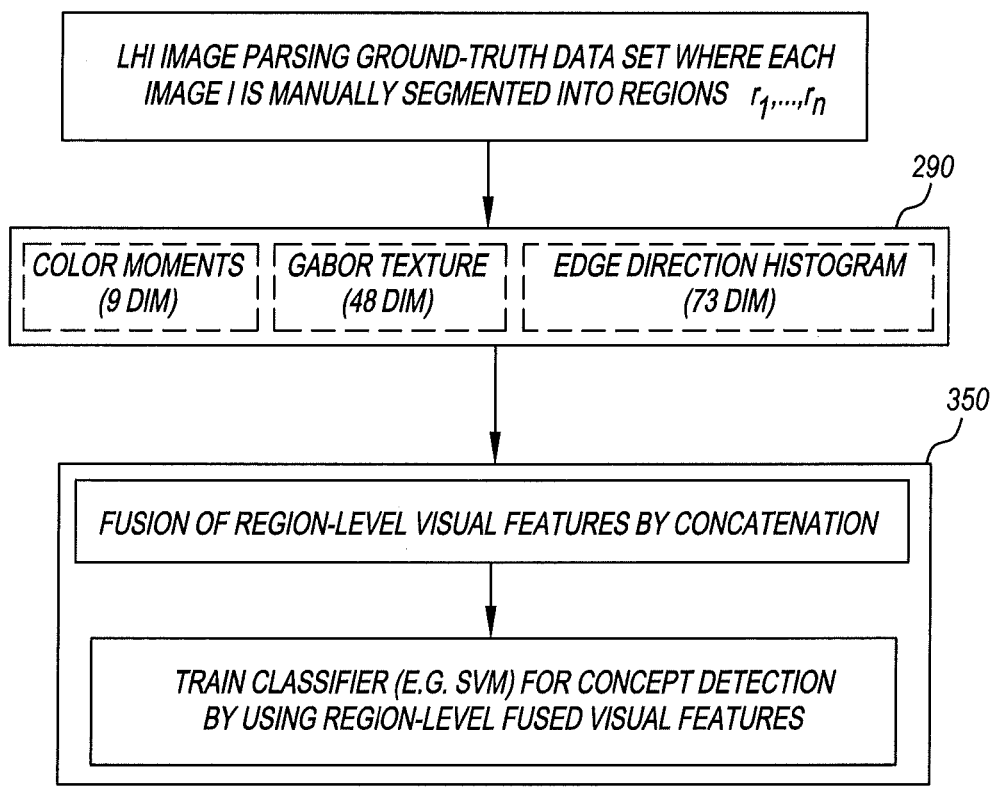
FIG. 8 is a graph illustrating processing modules utilized to train region-level concept detectors.

The second outside data source is the LHI image parsing ground-truth data set (the free version), as described in the paper by B. Yao et al., "Introduction to a large scale general purpose ground truth dataset: methodology, annotation tool & benchmarks", EMMCVPR, 2007. This data set contains images from 6 categories: manmade object, natural object, object in scene, transportation, aerial image, and sport activity. These images are manually segmented and the regions are labeled to 247 concepts. FIG. 8 depicts the training process for learning the region-level concept detectors. As described in the region-level visual feature extraction module 290, low-level visual features, e.g., color moments, Gabor texture and edge direction histogram, are extracted from each region, and SVM classifiers are trained by using each region as one data point for detecting the 247 region-level concepts, as described in region-level concept training module 350. On the other hand, images in our event data set are automatically segmented into image regions based on the homogeneity of color and texture by using the image segmentation module 280, and low-level visual features are also extracted from segmented regions by using the region-level visual feature extraction module 290. Then region-level concept detectors learned from the LHI set by region-level concept detection module 300 are applied to classify each image region in the event data resulting in a set of concept detection scores for each image region. These region-level cross-domain concept prediction scores can also be fed into the bag-of-features event-level representation leaning framework to generate event-level BOF features, as described in the BOF learning using region-level concept score module 313.

Several types of event-level BOF features learned from image-level or region-level concept scores generated by concept detectors from other domains such as LSCOM and LHI are described above. Low-level visual features at both image level and region level can also be used to describe an image in our event data (a still photo or a keyframe in video) as a single-point data set or a multiple-point data set. Using the same bag-of-features event-level representation learning framework, the event-level BOF representation is generated based on straightforward low-level image level features as described by the BOF learning using image-level visual feature module 311 or based on straightforward low-level region level features as described by the BOF learning using region-level visual feature module 314. All these event-level BOF features are fused together for training semantic concept detectors, as described in the classifier training module 330.

Figure 7:
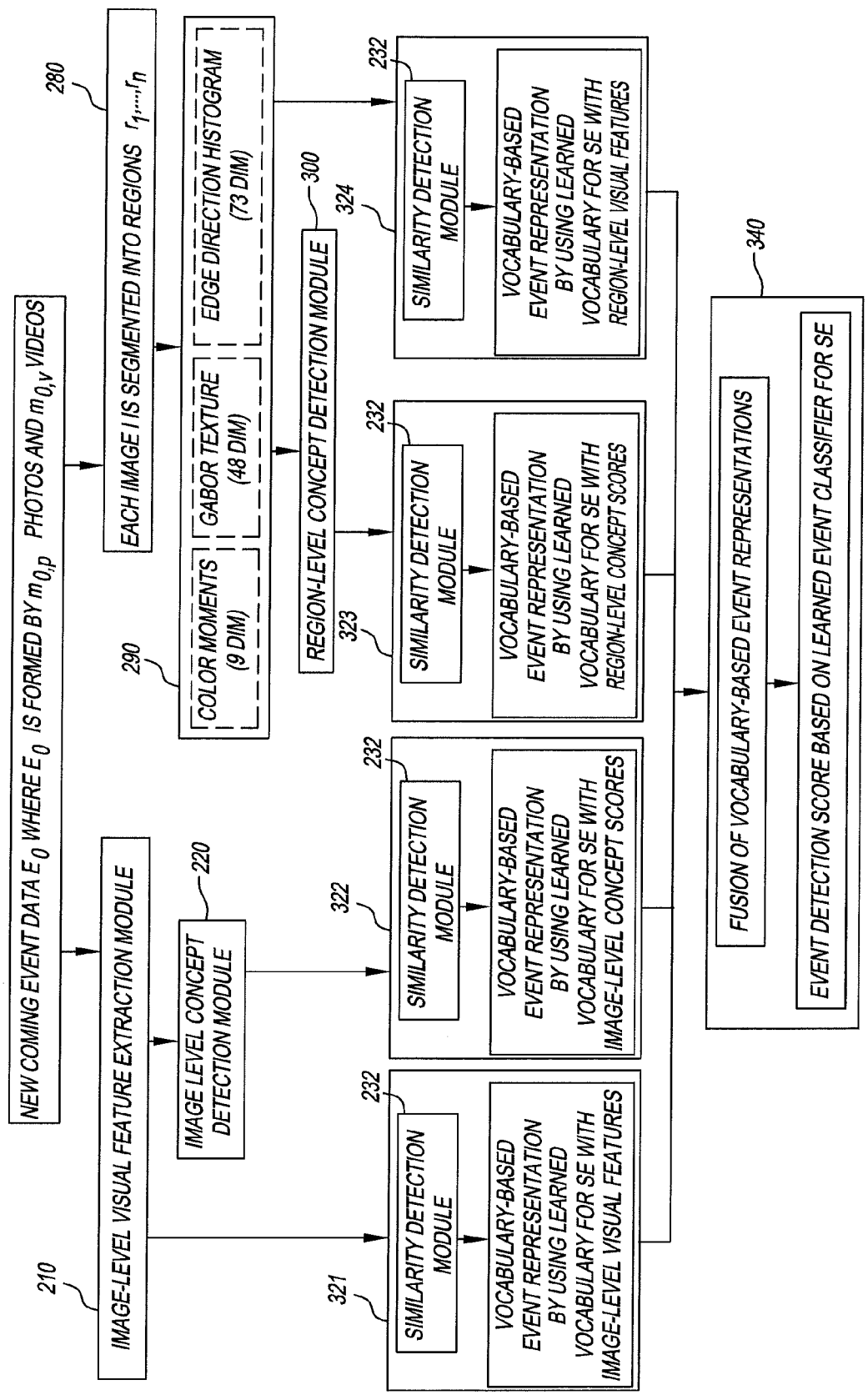
FIG. 7 is a flow diagram illustrating processing modules utilized by the semantic event detection system illustrated in FIG. 1.

FIG. 7 depicts the details of the semantic event detection process utilized by the semantic event detection system illustrated in FIG. 2 for classifying new coming events. Given a new event $E_0$, through the image-level visual feature extraction module 210 image-level features are extracted for each image (a photo or a keyframe in video) in $E_0$. Also, image-segmentation module 280 is applied to generate regions from each image and use region-level visual feature extraction module 290 to obtain a set of region-level features. Then through processing modules 321 and 324, respectively, BOF event-level features are generated using straightforward image-level visual features and region-level visual features. In addition, image-level concept detection module 220 and region-level concept detection module 300 are applied to obtain image-level and region-level concept detection scores respectively. Then by using modules 322 and 323, respectively, BOF event-level features are generated using image-level concept scores and region-level concept scores. Finally all different types of BOF event-level features are fused together to feed into the classification module 340 resulting in the semantic event detection results.

Testing of the above described semantic detection system and method was conducted by evaluating 1972 consumer events from the aforementioned consumer dataset created by A. Loui, et al, which are labeled to 10 different semantic events whose detailed definitions are shown in the table provided in FIG. 5. A total of 1261 events were randomly selected for training, and the rest were used for testing. The training and testing data was partitioned at the macro-event level, i.e., events from the same macro-event were treated together as training or testing data. This avoids the situation where similar events from the same macro-event are separated, which will simplify the classification problem.

Average precision (AP) was used as the performance metric, which has been used as an official metric for video concept detection. It calculates the average of precision values at different recall points on the precision-recall curve, and thus evaluates the effectiveness of a classifier in detecting a specific semantic event. When multiple semantic events are considered, the mean of APs (MAP) is used.

Figure 9:
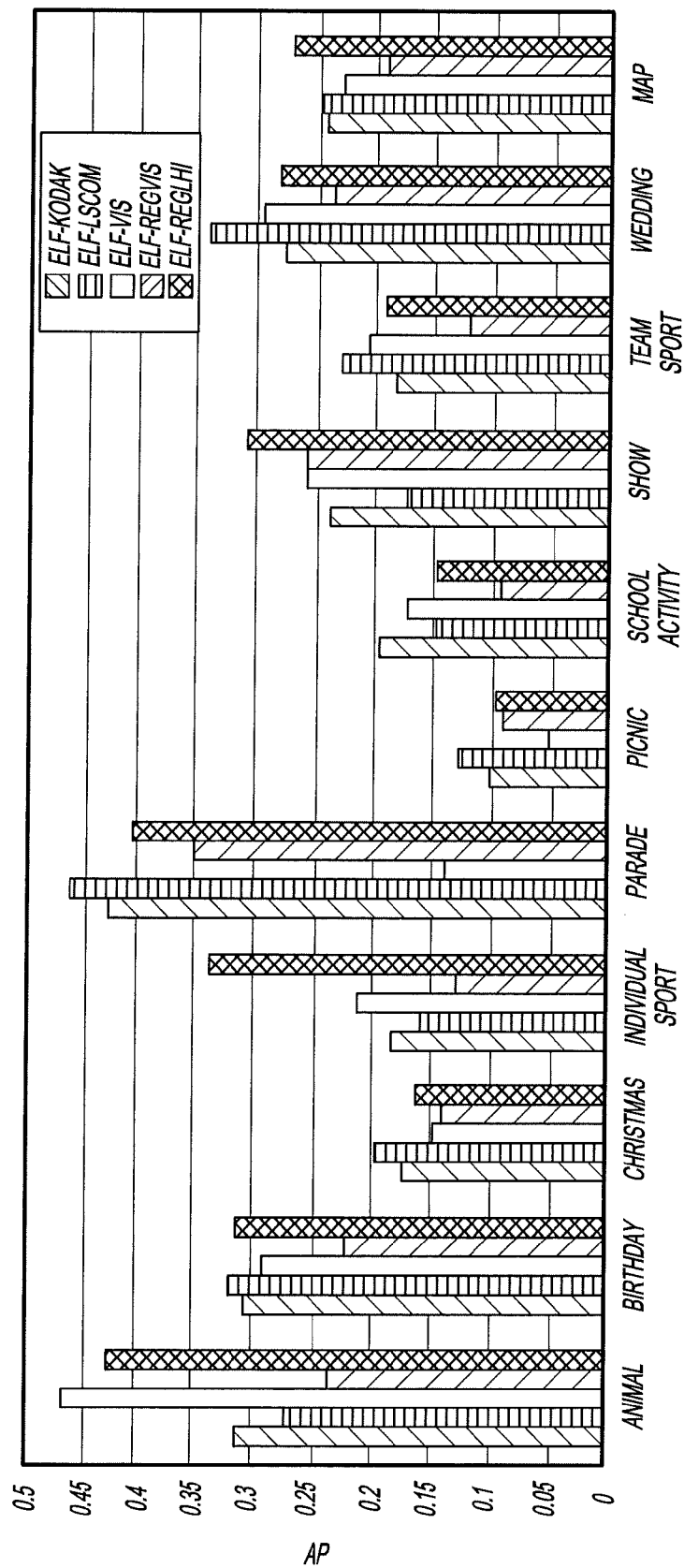
FIG. 9 is a graph comparing the performances of different individual types of event-level BOF representation in the present invention in detecting semantic events.

An experiment on semantic event detection using different individual types of event-level BOF representations was conducted. FIG. 9 gives the AP and MAP comparison. In general each type of event-level BOF features has advantages in detecting different semantic events, and no single type can outperform others consistently. The event-level BOF representations learned from concept scores perform well over complicate semantic events like "parade" which are composed by many simple concepts, e.g., parade is formed by people, street, crowd, etc. On the other hand, the event-level BOF representation learned from visual features perform extremely well over semantic events that are determined by only one or a few concepts, such as "animal", where the detection scores for other constructive concepts are not so helpful. In terms of image-level concept score, large ontology (LSCOM) performs better than small ontology, although concept detectors for the later are trained with consumer videos that are more similar to our consumer event data than the TRECVID news data where LSCOM detectors are trained.

Figure 10:
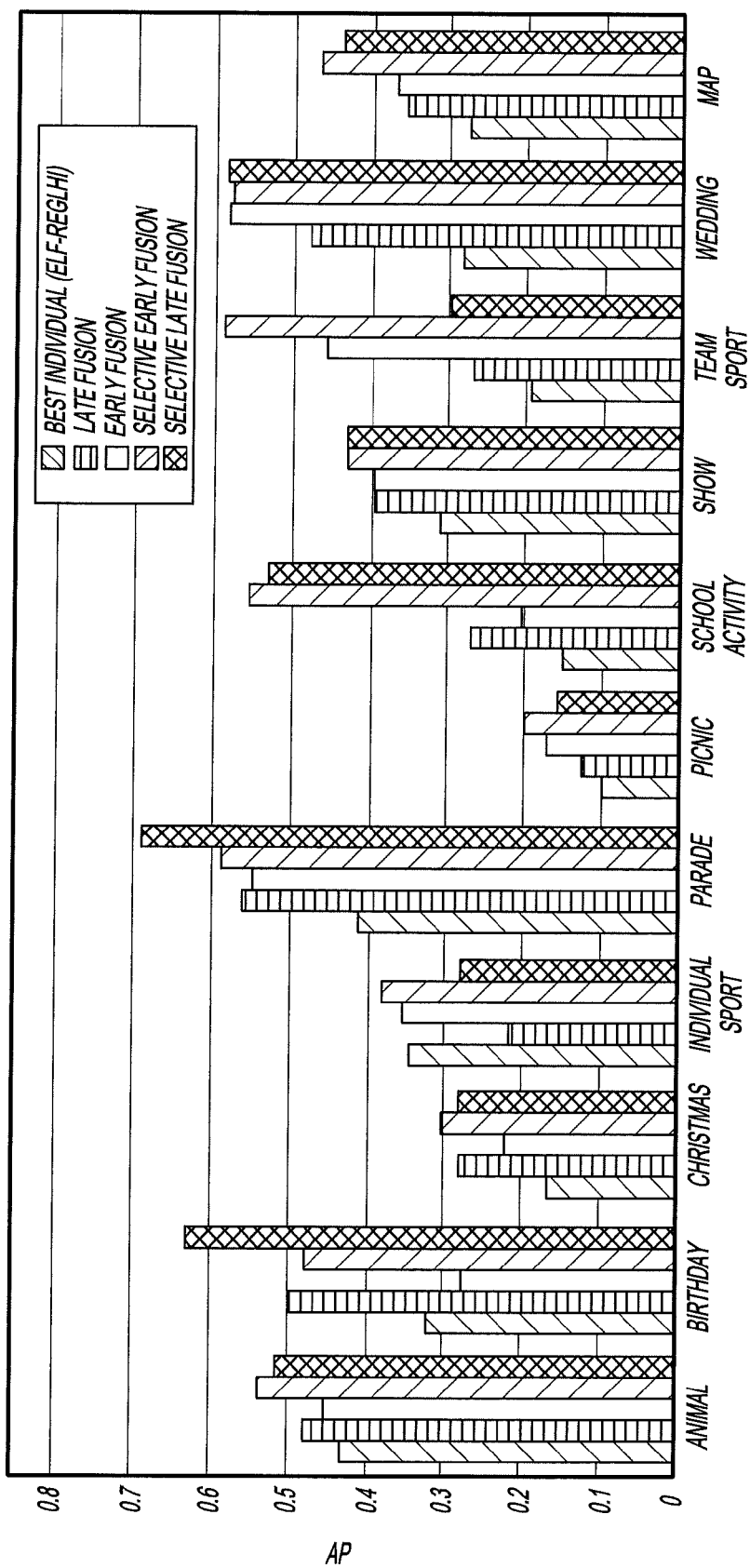
FIG. 10 is a graph comparing the results of fusing different types of event-level BOF representation with the best individual type in detecting semantic events.

FIG. 10 shows AP and MAP of the best individual type of event-level BOF approach and 4 different fusion methods. In early fusion, all types of event-level BOF features are concatenated into a long vector for training SVM classifiers. In late fusion, SVM classifiers are trained based on each type of event-level BOF representation individually and then the output classification results from different types of SVMs are averaged together to give the final detection results. In selective early fusion, the optimal types of event-level BOF features are chosen for generating the concatenated long feature vector through the forward selection technique. That is, a single optimal type is first fixed, and from all the rest the optimal type which has the best combination performance with the first type is selected, and from the rest the optimal type to combine with the first two is selected, etc. In selective late fusion, the optimal types of individual SVM classification results are chosen to combine in the similar forward selection manner. From the result, consistent performance improvement is achieved over every semantic event when combining different types of event-level BOF representation, by either early or late fusion. For example, about 35% MAP gain is obtained on a relative basis compared with the best performing individual type. In addition, when selectively combining these different types of event-level BOF features, further performance gain is obtained. Compared with the best individual type of event-level BOF representation, the selective fusion approach gets more than 70% performance improvement in terms of MAP.

It is to be understood that the exemplary embodiment(s) is/are merely illustrative of the present invention and that many variations of the above-described embodiment(s) can be devised by one skilled in the art without departing from the scope of the invention. It is therefore intended that all such variations be included within the scope of the following claims and their equivalents.

PARTS LIST 100 system
110 data processing unit
120 peripheral unit
130 user interface unit
140 memory unit
200 data entry module
210 visual feature extraction module
220 concept detection module
222 concept score detection module
224 fusion module
230 bof module
232 similarity detection module
234 mapping module
241 classifier module
250 bag of features event-level representation learning module
252 spectral clustering module
254 mapping module
260 classifier training module
270 concept training module
280 image segmentation module
290 region-level visual feature extraction module
300 region-level concept detection module
311 bog learning using image-level visual feature module
312 bof learning using image-level concept score module
313 bof learning using region-level concept score module
314 bof learning using region-level visual feature module
321 processing module
322 module
323 module
324 processing module
330 classifier training module
340 classification module
350 region-level concept training module

The invention claimed is:

1. A method for facilitating semantic event classification of a group of image records related to an event, the method using an event detector system for providing:

extracting a plurality of visual features from each of the image records;

wherein the visual features include segmenting an image record into a number of regions, in which the visual features are extracted;

generating a plurality of concept scores for each of the image records using the visual features, wherein each concept score corresponds to a visual concept and each concept score is indicative of a probability that the image record includes the visual concept;

determining a pair-wise similarity between pairs of data points corresponding to training events to produce a codebook of semantic events by applying spectral clustering to group the data points into different clusters, with each cluster corresponding to one code word, based on the determined pair-wise similarities;

mapping the training events to the codebook of semantic events to generate a first feature vector corresponding to each training event;

training an event classifier based on the first feature vectors corresponding to the training events;

generating a second feature vector by calculating a pair-wise similarity between the concept scores of the image records and concept scores for predetermined training data points;

mapping the second feature vectors to the codebook of semantic events to produce a third feature vector; and supplying the third feature vector to the event classifier that identifies at least one semantic event.

2. The method for facilitating semantic event classification as claimed in claim 1, further comprising using cross-domain learning to generate the feature vector.

3. The method for facilitating semantic event classification as claimed in claim 2, wherein the cross-domain learning is based on image-level or region-level features.

4. The method for facilitating semantic event classification as claimed in claim 1, wherein the image records include at least one digital still image and at least one video segment.

5. The method for facilitating semantic event classification as claimed in claim 4, wherein the extracting of a plurality of visual features includes extracting a keyframe from the video segment and extracting the plurality of visual features from both the keyframe and the digital still image.

6. The method for facilitating semantic event classification as claimed in claim 5, wherein the generation of the concept scores includes generating initial concept scores for each keyframe and each digital still image corresponding to each of the extracted visual features.

7. The method for facilitating semantic event classification as claimed in claim 6, wherein the generation of the concept scores further includes generating ensemble concept scores for each keyframe and each digital still image based on the initial concept scores.

8. A method for facilitating semantic event classification as claimed in claim 7, wherein the ensemble concept scores are generated by fusing the initial concept scores for each extracted visual feature for a given keyframe or a given digital still image.

9. A method for facilitating semantic event classification as claimed in claim 1, further comprising tagging each of the image records with the semantic event classifier.

* * * * *

UNITED STATES PATENT AND TRADEMARK OFFICE
CERTIFICATE OF CORRECTION

| | | |
|---|---|---|
| PATENT NO. | : 8,213,725 B2 | Page 1 of 1 |
| APPLICATION NO. | : 12/408140 | |
| DATED | : July 3, 2012 | |
| INVENTOR(S) | : Alexander C. Loui et al. | |

It is certified that error appears in the above-identified patent and that said Letters Patent is hereby corrected as shown below:

"Related US Application Data" – should be deleted.

"Provisional Application No. 61/058,201, filed on June 2, 2008" – should be deleted.

Signed and Sealed this
Twenty-fifth Day of September, 2012

David J. Kappos
*Director of the United States Patent and Trademark Office*